(12) United States Patent
Edelman

(10) Patent No.: US 11,898,875 B2
(45) Date of Patent: Feb. 13, 2024

(54) METHOD AND APPARATUS FOR SINGLE CAMERA OPTICAL MEASUREMENTS

(71) Applicant: Topcon Positioning Systems, Inc., Livermore, CA (US)

(72) Inventor: Leonid Valerianovich Edelman, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 296 days.

(21) Appl. No.: 17/179,448

(22) Filed: Feb. 19, 2021

(65) Prior Publication Data

US 2021/0190484 A1 Jun. 24, 2021

Related U.S. Application Data

(63) Continuation of application No. 15/561,326, filed as application No. PCT/RU2016/000022 on Jan. 25, 2016, now Pat. No. 10,962,363.

(51) Int. Cl.
*G01C 3/08* (2006.01)
*G01C 15/06* (2006.01)

(52) U.S. Cl.
CPC .............. *G01C 3/08* (2013.01); *G01C 15/06* (2013.01)

(58) Field of Classification Search
None
See application file for complete search history.

(56) References Cited

U.S. PATENT DOCUMENTS

| 4,490,617 A | 12/1984 | Loose |
| 4,893,922 A | 1/1990 | Eichweber |
| 5,204,731 A | 4/1993 | Tanaka et al. |
| 5,297,061 A | 3/1994 | Dementhon et al. |
| 5,771,099 A | 6/1998 | Ehbets |
| 5,818,424 A | 10/1998 | Korth |
| 5,867,273 A | 2/1999 | Corby |
| 5,995,650 A | 11/1999 | Migdal et al. |
| 6,072,903 A | 6/2000 | Maki et al. |
| 6,611,141 B1 | 8/2003 | Schultz et al. |
| 6,675,122 B1 | 1/2004 | Markendorf et al. |
| 6,724,930 B1 | 4/2004 | Kosaka et al. |
| 7,728,963 B2 | 6/2010 | Kirschner |
| 7,913,405 B2 | 3/2011 | Berg et al. |

(Continued)

FOREIGN PATENT DOCUMENTS

| EP | 1865465 A1 | 12/2007 |
| JP | H07139942 A | 6/1995 |

(Continued)

OTHER PUBLICATIONS

Extended European Search Report dated Nov. 29, 2019, in connection with European Patent Application Serial No. 16888330.4, 16 pgs.

(Continued)

*Primary Examiner* — Luke D Ratcliffe
(74) *Attorney, Agent, or Firm* — Chiesa Shahinian & Giantomasi PC

(57) ABSTRACT

An optical measurement system and method that utilizes a single camera in combination with a specially configured target object which significantly improves optical measuring accuracy with respect to the measurement of distance, height difference and position.

18 Claims, 8 Drawing Sheets

(56) References Cited

U.S. PATENT DOCUMENTS

| | | | |
|---|---|---|---|
| 8,164,628 | B2 | 4/2012 | Stein et al. |
| 8,212,993 | B2 | 7/2012 | Prams et al. |
| 8,331,624 | B2 | 12/2012 | Braunecker et al. |
| 8,510,964 | B2 | 8/2013 | Nagano |
| 8,567,076 | B2 | 10/2013 | Ortleb et al. |
| 2005/0026689 | A1 | 2/2005 | Marks |
| 2007/0182725 | A1 | 8/2007 | Pittel |
| 2007/0206175 | A1 | 9/2007 | Rai et al. |
| 2010/0182430 | A1 | 7/2010 | Kroepfl et al. |
| 2011/0235923 | A1 | 9/2011 | Weisenburger et al. |
| 2012/0124850 | A1 | 5/2012 | Ortleb et al. |
| 2012/0188529 | A1 | 7/2012 | France |
| 2012/0224052 | A1 | 9/2012 | Bae |
| 2012/0307230 | A1 | 12/2012 | Dorrington et al. |
| 2012/0330601 | A1 | 12/2012 | Soubra et al. |
| 2013/0050474 | A1 | 2/2013 | Metzler |
| 2013/0139395 | A1 | 6/2013 | Amor |
| 2013/0152413 | A1* | 6/2013 | Nagao ............... G01C 9/06 33/366.23 |
| 2013/0162469 | A1 | 6/2013 | Zogg et al. |
| 2013/0222589 | A1 | 8/2013 | Lalonde et al. |
| 2013/0276315 | A1* | 10/2013 | Kahle ............... G01C 15/004 33/291 |
| 2013/0304331 | A1 | 11/2013 | Braunstein et al. |
| 2014/0022539 | A1 | 1/2014 | France |
| 2014/0063258 | A1 | 3/2014 | Schweid et al. |
| 2014/0104602 | A1 | 4/2014 | Vogel et al. |
| 2014/0232859 | A1 | 8/2014 | Kotzur et al. |
| 2015/0363936 | A1* | 12/2015 | Hallett ............... G06F 3/0325 382/106 |

FOREIGN PATENT DOCUMENTS

| | | |
|---|---|---|
| JP | 2007225423 A | 9/2007 |
| WO | 2013012335 A | 1/2013 |

OTHER PUBLICATIONS

Communication pursuant to Rule 164(1) and partial Supplementary Search Report dated Aug. 1, 2019, in connection with European Patent Application No. 16888330.4, 14 pgs.

Masolov A.V. et al., Geodeziya, Moskva "Nedra" 1964, tom 1, pp. 102-111, paragraphs 44-47 (English translation of NPL #3 identified previously on IDS dated Sep. 25, 2017).

Berntsen.com; "Reflective Tape Targets/Reflective Survey Targets"; downloaded from http://www.berntsen.com/Surveying/Smart-Targets-Datums-Relectors/Reflective-Tape_Targets on Nov. 21, 2013; pp. 1-6.

International Search Report and Written Opinion dated Aug. 20, 2015, in connection with International Patent Application No. PCT/US2015/033323, 15 pgs.

International Search Report and Written Opinion dated Nov. 3, 2016, in connection with International Patent Application No. PCT/RU2016/000022, 8 pgs.

Communication pursuant to Article 94(3) EPC dated Feb. 16, 2022, in connection with European Patent Application No. 16888330.4, filed Jan. 25, 2016, 11 pgs.

* cited by examiner

METHOD AND APPARATUS FOR SINGLE CAMERA OPTICAL MEASUREMENTS

CROSS-REFERENCE TO RELATED APPLICATIONS

This application is a Continuation of prior-filed U.S. Utility patent application Ser. No. 15/561,326, filed Sep. 25, 2017, which is a National Stage (under 35 U.S.C. 371) of International Patent Application No. PCT/RU2016/000022, filed Jan. 25, 2016, the disclosures of both are incorporated herein by reference in their entirety.

TECHNICAL FIELD

The present invention relates generally to a measurement system for determining a position of an object or a portion of the object, and, more particularly, to a method and apparatus for determining distance, height differential and/or position of an object using optical measurements from a single camera.

BACKGROUND OF THE INVENTION

The application of optical cameras for position measuring is well-established. For example, in a typical optical measurement system an optical image is used for measuring angles between a camera position and two (2) objects on the image. Knowing the camera's optical properties (e.g., using calibration procedures), one can identify such objects with very good accuracy and in some cases with an accuracy level of one (1) pixel. Further, given both a known reference point (i.e., an object with known coordinates) and a known position of the camera it is also possible to measure the direction to any object on the image. By measuring the direction to a particular object from two (2) or more cameras, the two-dimensional (2D) or three-dimensional (3D) position can also be estimated using the intersection of directions from the different camera positions.

As will be appreciated, it may also be possible to measure the distance (i.e., range) from an object to the camera, however, such a calculation necessarily requires knowing the object's physical size. For example, taking an image of an object that has an overall size of two (2) meters from a distance of ten (10) meters from a camera having an angular resolution of 1 angular minute will result in the image being approximately 690 pixels long. In terms of distance measuring systems using such images, it will further be appreciated that various errors may occur and are generally estimated to be proportional to the square of the distance being measured, and inversely proportional to the size of the object. As such, given these error measuring relationships, there can be a wide disparity in accuracy of such optical measurement systems in estimating the distance from a target, in particular, in a single camera arrangement.

Therefore, a need exists for an improved technique for increasing the accuracy of optical measurement systems using a single camera.

BRIEF SUMMARY OF THE INVENTION

In accordance with various embodiments, an optical measurement system and method is provided that utilizes a single camera in combination with a specially configured target object which significantly improves optical measuring accuracy with respect to the measurement of distance, height difference and/or position.

More particularly, in accordance with an embodiment, optical measurements from a single camera are facilitated by employing a target object configured with a plurality of contrasting markings where the contrasting markings have fixed and known geometric characteristics and relationships. In an embodiment, the target object is a vertical cylindrical rod having a fixed diameter with a plurality of horizontally configured contrasting markings equally spaced along all or substantially all of the outer surface of the rod. In accordance with an embodiment, the total number of horizontally configured markings ("N") is in the range of 15 to 50, the rod is about two (2) meters in length and 2 to 3 centimeters in diameter with the length and diameters chosen as function of the particular application and desired accuracy. Of course, there are any number of combinations of target object shapes, total markings, target objects lengths and diameters that can be used for various embodiments.

In accordance with an embodiment, a single camera is positioned at a first location and levelled, the target object configured with a plurality of contrasting markings (as detailed above) is positioned at a second location and levelled, and an image is taken by the camera of the target object. The image is then processed to remove optical distortions (e.g., using the well-known Brown-Conrady image distortion model), and all (or substantially all) of the contrasting boundaries/edges on the target object are located and identified on the image by applying certain image processing such as SURF (Speeded Up Robust Features). Next, the size of the target object on the image is estimated by applying certain mathematical optimization procedures such as least square regression using the identified locations of the contrasting boundaries/edges (as detailed above) and the known (i.e., defined) geometric properties of the target object (e.g., the length and diameter). Finally, an estimate of the distance to the target object is made using the estimated size of the target object, the known geometric properties of the target object, and the defined optical properties of the single camera.

In accordance with a further embodiment, a single camera is positioned at a first location and levelled, the target object configured with a plurality of contrasting markings (as detailed above) is positioned at a second location and levelled, and an image is taken by the camera of the target object. The image is then processed to remove optical distortions and all (or substantially all) of the contrasting boundaries/edges on the target object are located and identified on the image by applying certain image processing such as SURF. Next, the locations of the contrasting boundaries/edges on the target object with respect to a horizontal centerline associated with the image of the target object are estimated by applying certain mathematical optimization procedures such as least square regression using the identified locations of the contrasting boundaries/edges (as detailed above) and the known geometric properties of the target object (e.g., the length and diameter). Illustratively, the horizontal centerline is established as a horizontal row of pixels with zero ("0") vertical angle, for example, being parallel to the surface of the Earth. In this way, an estimation of the locations of the contrasting boundaries/edges on the target object is facilitated with a subpixel accuracy. Finally, an estimate of the height difference from the single camera to the target object is made by developing and examining a mathematical relationship between the estimation of the locations of the contrasting boundaries/edges on the target object to the defined geometric properties of the target object (e.g., the length and diameter). Illustratively, the distance measurements have been previously made, and a scale factor is estimated therefrom for the target object on the image. The scale factor is the ratio of the physical size of the target object to the size of the target object's image in pixels. The scale factor is then applied to a multiplication of the distance in pixels between the image's horizontal centerline and the given point of the target object (e.g., the top, middle, or bottom of the target object) resulting in the determination of the height difference (measured, for example, in meters) between the known point associated with the camera (which corresponds to the image horizontal centerline), and the given point on the target object. Further, knowing the physical characteristics of the camera and the target object, the height difference may be further utilized to determine the height difference between the respective point/location (on the ground) associated with the camera and target object.

In accordance with a further embodiment, measurement of distance and height difference is accomplished when the levelling of the single camera or the target object is not possible (e.g., when in or on a moving vehicle). In an embodiment where the single camera is not levelled, the single camera is equipped with an inclination sensor from which certain additional input will be captured to facilitate the distance and height difference estimations. In particular, a single camera configured with the inclination sensor is positioned at an unlevelled first location, and at least one target object (as detailed above) is positioned at a second location, and levelled, and at least one image is taken by the camera of the target object. The image(s) are then processed to remove optical distortions. Next, angles with respect to the horizontal plane (i.e., the pitch and roll of the camera) as measured by the inclination sensor are directly applied to the image and taken to rotate the image as if the image was captured from the levelled position with further processing occurring as if the camera was levelled. Next, all (or substantially all) of the contrasting boundaries/edges on the target object are located and identified on the image(s) by applying certain image processing such as SURF. Next, the size of the target object on the image(s) is estimated by applying certain mathematical optimization such as least square regression using the identified locations of the contrasting boundaries/edges (as detailed above) and the known geometric properties of the target object (e.g., the length and diameter). Finally, an estimate of the distance to the target object from the camera is made and the height differences between the target object and the camera is made using the estimated size of the target object, the defined geometric properties of the target object, the known optical properties of the single camera, as detailed above, together with the additional input from the inclination sensor of the camera which includes measurements of the respective inclinations between the target object and the single camera.

In accordance with an embodiment where the target object is not levelled, at least two (2) cameras are utilized. In particular, a target object is positioned at an unlevelled first location, and at least two (2) cameras are positioned at a second location and third location, respectively, and levelled, and one (1) image of the target object is taken by each of the respective cameras. In accordance with the embodiment, the positions of the cameras are selected such that they are in different directions from the target object (i.e., they are not directly opposite one another in the same path). The images are then processed to remove optical distortions, and all (or substantially all) of the contrasting boundaries/edges on the target objects are located and identified on the images by applying certain image processing such as SURF. Next, the inclinations of the images of the target object on each image are measured. For each camera, these inclinations are a function of pitch and roll of the target object in the orthogonal coordinate system relative to the camera. If the relative positions and orientations of the camera(s) in space are known, 2 equations define the spatial transformation between these camera coordinate systems, and hence define a relation between pitch and roll of the target object with respect to these systems. Next, this system of defined equations (i.e., 4 equations) is solved (which can be done if both cameras and the target object do not lie on the same line), and estimates of pitch and roll of the target object are obtained. The inclination of the target object with respect to the horizontal plane is estimated from inclinations of the images of the target object on images taken from these 2 cameras.

Next, the size of the target objects on the images is estimated by applying certain mathematical optimization such as least square regression using the identified locations of the contrasting boundaries/edges (as detailed above) and the known geometric properties of the target objects (e.g., the length, diameter, and the pitch and roll angles). Finally, an estimate of the distance to the target object from each of the cameras is made and the height differences between the target object and the cameras is made using the estimated size of the target objects, the defined geometric properties of the target objects, and the optical properties of the cameras, as detailed above. If the relative positions and/or orientations of the cameras are not known, they can be estimated from the estimation of distance, the height difference and direction to the target object. First, roll and pitch angles are set to some initial value (for example, for each image, the pitch angle can be set to zero and the roll angle set to the value of the inclination of the image of the target object), distances and height differences from each camera to the target object are estimated as detailed above, directions from each camera to the target object are measured directly from the images, and from the aforementioned values the relative positions and orientations of the cameras are estimated. Next, the roll and pitch angles of the target object are estimated by the procedure described above, and relative positions and orientations of the cameras are re-estimated. Next, this step is repeated until the process converges.

In accordance with a further embodiment, one of either the single camera or the target object is at an unknown location and its position is determined. In particular, in an embodiment, the target object is set at a first unknown point, the single camera is set at a second known point, each of the target object and single camera are levelled at their respective locations, and an image is taken of the target object. Using the image taken, a third known point is identified (a so-called "backsight") which is illustratively identified by the operator of the camera from the image and the coordinates provided as input to the image measurement system. Alternatively, the backsight may be automatically determined on the image by the image measurement system, for example, by placing a predefined target on the backsight, or the location of the backsight can be determined from a previous image. Further, the angle from the backsight to the target object is determined by counting horizontally the number of pixels between respective images of the target object, and multiplying by the horizontal angular resolution of a pixel. Next, the distance and height difference from the single camera to the target object are determined as set forth herein above. Then, the position of the target object is determined using the known positions of the single camera and backsight, the computed angle from the backsight to the target object, and the computed distance and height difference from the camera to the target object.

In accordance with a further embodiment, at least two cameras are positioned at respective known locations (each of which is levelled) and the target object is located at an unknown location (which is not levelled and may be subject to an incline). An image is taken from each camera of the target object and, using the respective images, the distance and/or height differences from each camera to the target object may be determined as set forth above.

These and other advantages of the embodiments will be apparent to those of ordinary skill in the art by reference to the following detailed description and the accompanying drawings.

DETAILED DESCRIPTION

In accordance with various embodiments, an optical measurement system and method is provided that utilizes a single camera in combination with a specially configured target object which significantly improves optical measuring accuracy with respect to the measurement of distance, height difference and position.

Figure 1:
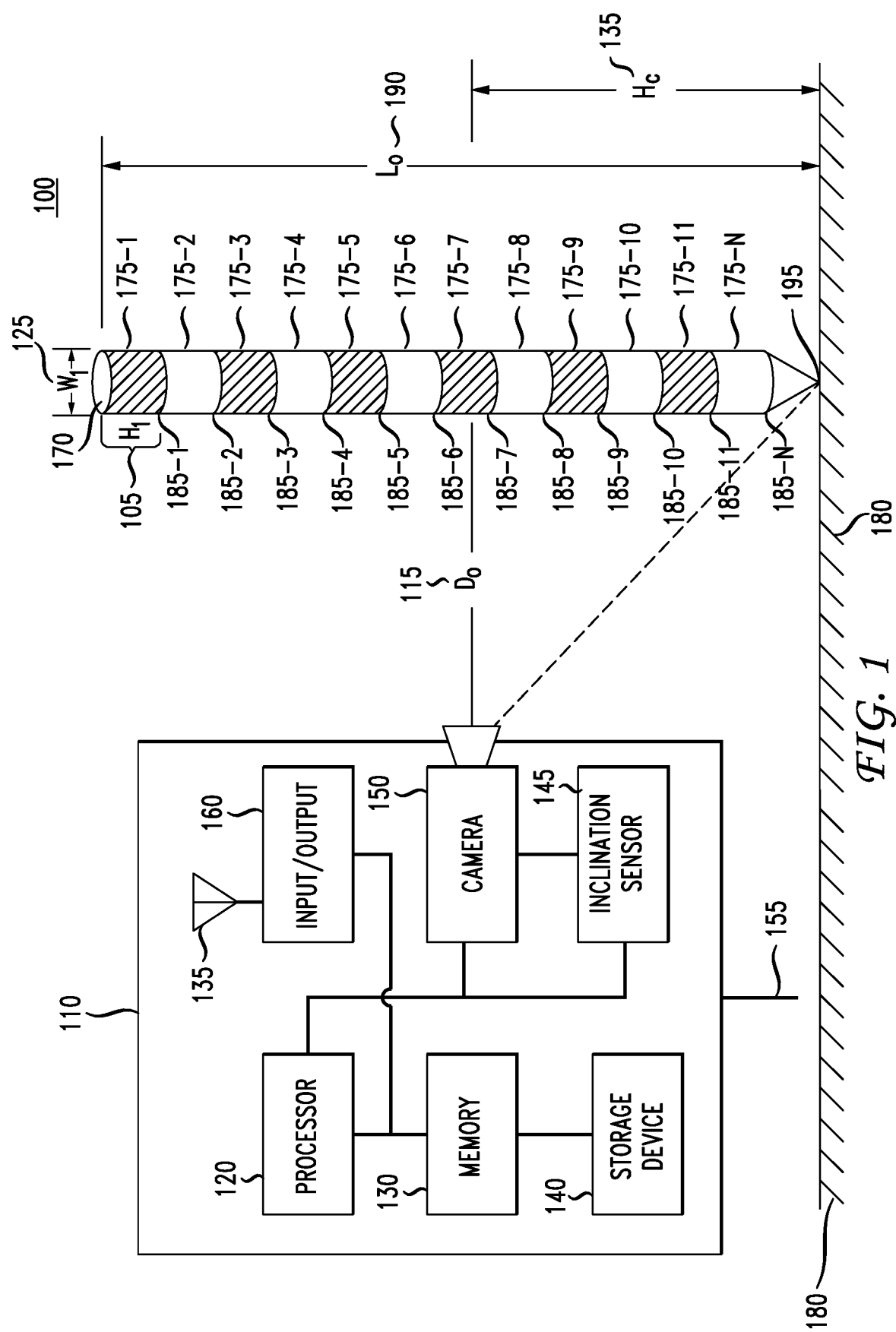
FIG. 1 shows a schematic representation of a measurement system in accordance with an embodiment.

FIG. 1 shows a schematic representation of measurement system 100 in use in accordance with an embodiment. More particularly, measurement apparatus 110 includes processor 120, memory 130, input-output module 160, camera 150, and storage device 140. As shown, measurement apparatus 110 includes inclination sensor 145 which is an optional feature in accordance with certain embodiments as further detailed herein below. Antenna 135 is a further optional feature of measurement apparatus 110 in embodiments where input-output module 160 includes radio communications interfaces, for example.

Processor 120 may be any suitable processor, computing module, data processing device, or combination of the same. Processor 120 is communicatively coupled with memory 130 and with a storage device 140 for storing computer-readable program instructions that provide the governing logic for controlling processor 120 to execute computer-readable program instructions stored in storage device 140 or other computer readable medium. Processor 120 may include both general and special purpose microprocessors, and may be the sole processor or one of multiple processors of measurement system 100. Processor 120 may comprise one or more central processing units (CPUs), for example. Processor 120 and memory 130 may include, be supplemented by, or incorporated in, one or more application-specific integrated circuits (ASICs) and/or one or more field programmable gate arrays (FPGAs).

Storage device 140 and memory 130 each comprise a tangible non-transitory computer readable storage medium. Storage device 140 and memory 130, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input-Output module 160 is a module which includes input means, such as a keypad, touchscreen, haptic controls, voice-recognition means and the like, used to identify user command input, for example to direct camera 150 toward target object 170 and to request determination of distance 115 (i.e., $D_O$) to target object 170, calculation of height difference 135 (i.e., $H_C$) between camera 150 and target object 170, and determination of a position of target object 170 (e.g. position 195). Input-Output module 160 also includes an output means, such as a display or a monitor to output images of target object 170, indicate an input command from a user, and display results of the calculation of distance 115, for example.

Camera 150 can be any type of camera, with one camera type preferably having a low distortion lens and high temperature stability. Camera 150 may have one or more optical sensors, multiple optical elements and/or panoramic capabilities. For example, in accordance with an embodiment, camera 150 is a matrix Charge-Coupled Device (CCD) sensor the operation of which is well-known in the art, coupled with a suitable optical lens. Alternatively, camera 150 is a system of multiple CCD sensors coupled with respective lenses thereby providing a 360 degree or wide-angle image. As shown, measurement apparatus 110 has an optional inclination sensor 145 which may be used in certain embodiments (as further detailed herein below) that will measure 2-axis inclination angles (or tilt angles, also known in the art as roll and pitch angles) between 0 and 360 degrees in a well-known manner. In an embodiment, camera 150 is configured to capture images of the markings of target object 170 and identify a center of the object for tracking and measuring. In accordance with an embodiment, optical measurements from camera 150 are facilitated by employing target object 170 which is a vertical cylindrical rod having a fixed diameter with a plurality of horizontally configured contrasting markings 175-1, 175-2, 175-3, 175-4, 175-5, 175-6, 175-7, 175-8, 175-9, 175-10, 175-11, and 175-N equally spaced along substantially all or some defined portion of the rod. In accordance with an embodiment, the number of horizontally configured markings ("N") is in the range of 15 to 50, the rod is about two (2) meters in length 190 (i.e., $L_1$) and 2-3 centimeters in diameter with the length and diameters chosen as function of camera 150 and its associated optical characteristics and properties.

As shown, target object 170 is configured with the plurality of contrasting markings 175-1 through 175-N where the contrasting markings have fixed and known geometric characteristics and relationships. For example, as illustratively shown in FIG. 1, each marking of the plurality of marking has a fixed height 105 (i.e., shown as $H_1$), fixed width 125 (i.e., $W_1$) which is the same as the fixed diameter of target object 170, and have alternating shading between a first marking type (see, e.g., contrasting marking 175-1 shown in black cross-hatch) and a second marking type (see, e.g., contrasting marking 175-2 shown in white color). Of course, the contrast/coloring arrangement shown is only illustrative in nature and there can be any number of contrasting arrangements (including various color and/or sizes) that are consistent with the disclosed embodiments with the main requirement being that such arrangements allow for a clear optical distinction between adjacent markings located on target object 170.

The contrast in the plurality of markings 175-1 through 175-N facilitates the definition of a plurality of boundaries 185-1, 185-2, 185-3, 185-4, 185-5, 185-6, 185-7, 185-8, 185-9, 185-10, 185-11, and 185-N which as detailed further herein below will be utilized to determine the estimate of distance 115. In accordance with the embodiment, camera 150 is positioned at a first location (e.g., location 155) on field 180 and levelled, target object 170 is positioned at a second location (i.e., location 195) on field 180 and levelled, and an image is taken by camera 150 of target object 170 as further illustrated in FIG. 2.

Figure 2:
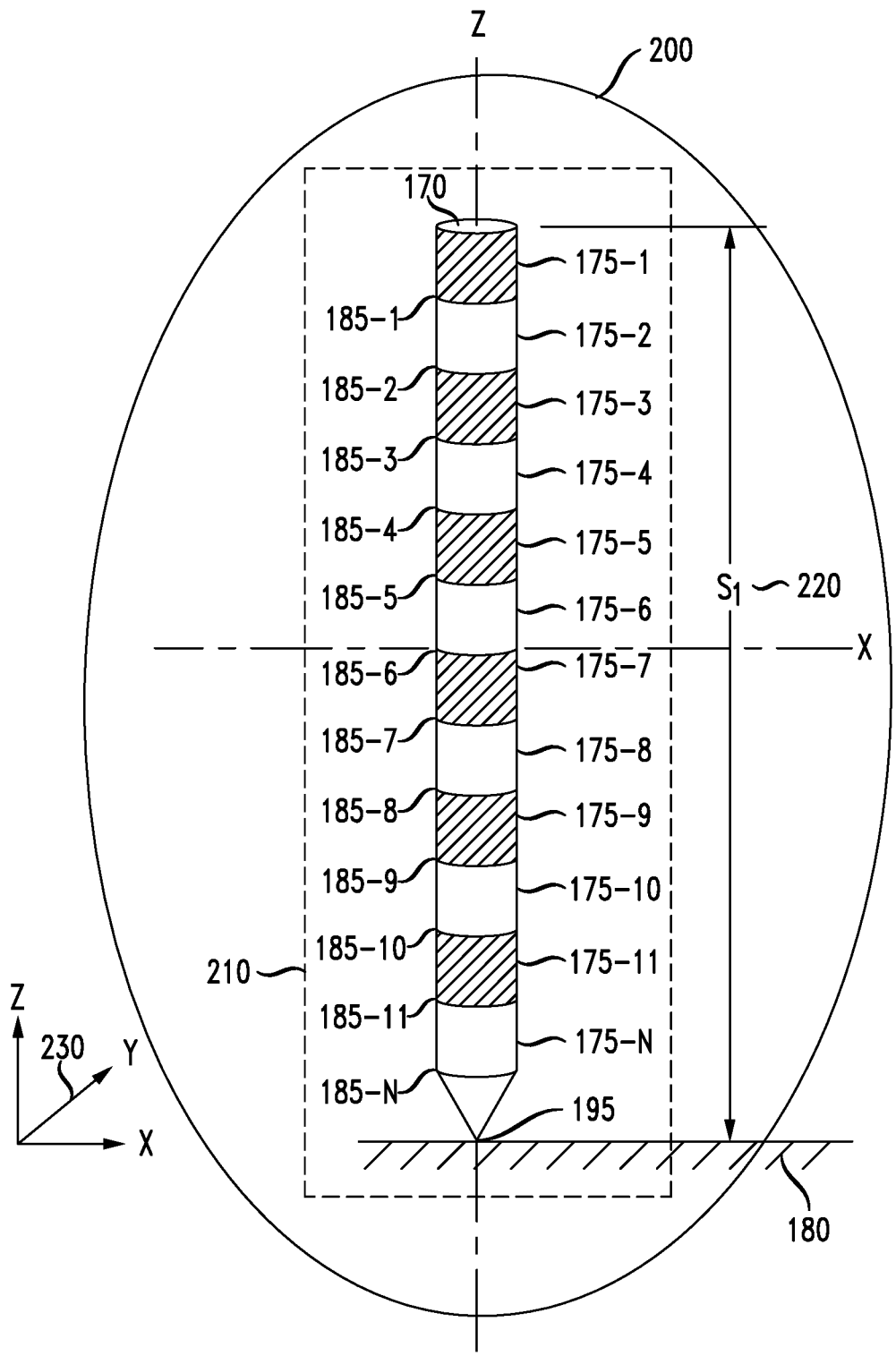
FIG. 2 shows the generation of an image of a target object in a field of view of the measurement system of FIG. 1 for measuring distance in accordance with an embodiment.

In particular, FIG. 2 shows field of view 200 which is an illustrative field of view associated with camera 150 as focused on target object 170. In the embodiment, field of view 200 also includes coordinate axes 230 where a vertical axes Z and a horizontal axes X are illustrated as a "crosshair" (overlayed on field of view 200) with a third axes (e.g., axes Y) being perpendicular to each of the vertical axes Z and the horizontal axes X. As described above, camera 150 takes image 210 of target object 170. Image 210 is then processed to remove optical distortions in a well-known manner (e.g., using the well-known Brown-Conrady image distortion model) with the optical distortion removal methodology being a function of the operating characteristics of camera 150, and all (or substantially all) of the contrasting boundaries/edges associated with the plurality of markings 175-1 through 175-N on target object 170 are located and identified on the image by applying certain image processing such as SURF (Speeded Up Robust Features). Next, size 220 (i.e., $S_1$) of target object 170 on image 210 is estimated by applying certain mathematical optimization procedures such as least square regression using the identified locations of the contrasting boundaries/edges associated with the plurality of markings 175-1 through 175-N and the defined geometric properties (i.e., $L_1$ 190 and W 125 as shown in FIG. 1) of target object 170. Finally, an estimate of the distance (i.e., $D_O$ 115 as shown in FIG. 1) to target object 170 is made using the estimated size of the target object (i.e., $S_1$ 220), the defined geometric properties (i.e., $L_1$ 190 and W 125) of the target object 170, and the known optical properties of camera 150.

Illustratively, the mathematical computation of the distance estimate is given by:

$$D = H/\tan(A) \quad \text{(Equation 1)}$$

where H is height of the target object, and A is vertical angular size of the target object on the image (i.e., the vertical angular size A=vertical size of the target object (in pixels) multiplied by the vertical angular resolution of a pixel).

The above Equation 1 is most efficient when D is greater than H, and the height difference ($\Delta H$) is small as compared to the horizontal distance D (i.e., D>$\Delta H$). If this is not the case, the individual size of the plurality of markings on the image will be different depending upon the vertical angle to each marking, and the procedure to estimate the size of the target object is adjusted accordingly in a well-known manner. As such, if D>$\Delta H$ is not satisfied, the vertical angle to the target object will be taken into account, in a well-known manner, when estimating the horizontal distance.

Figure 3:
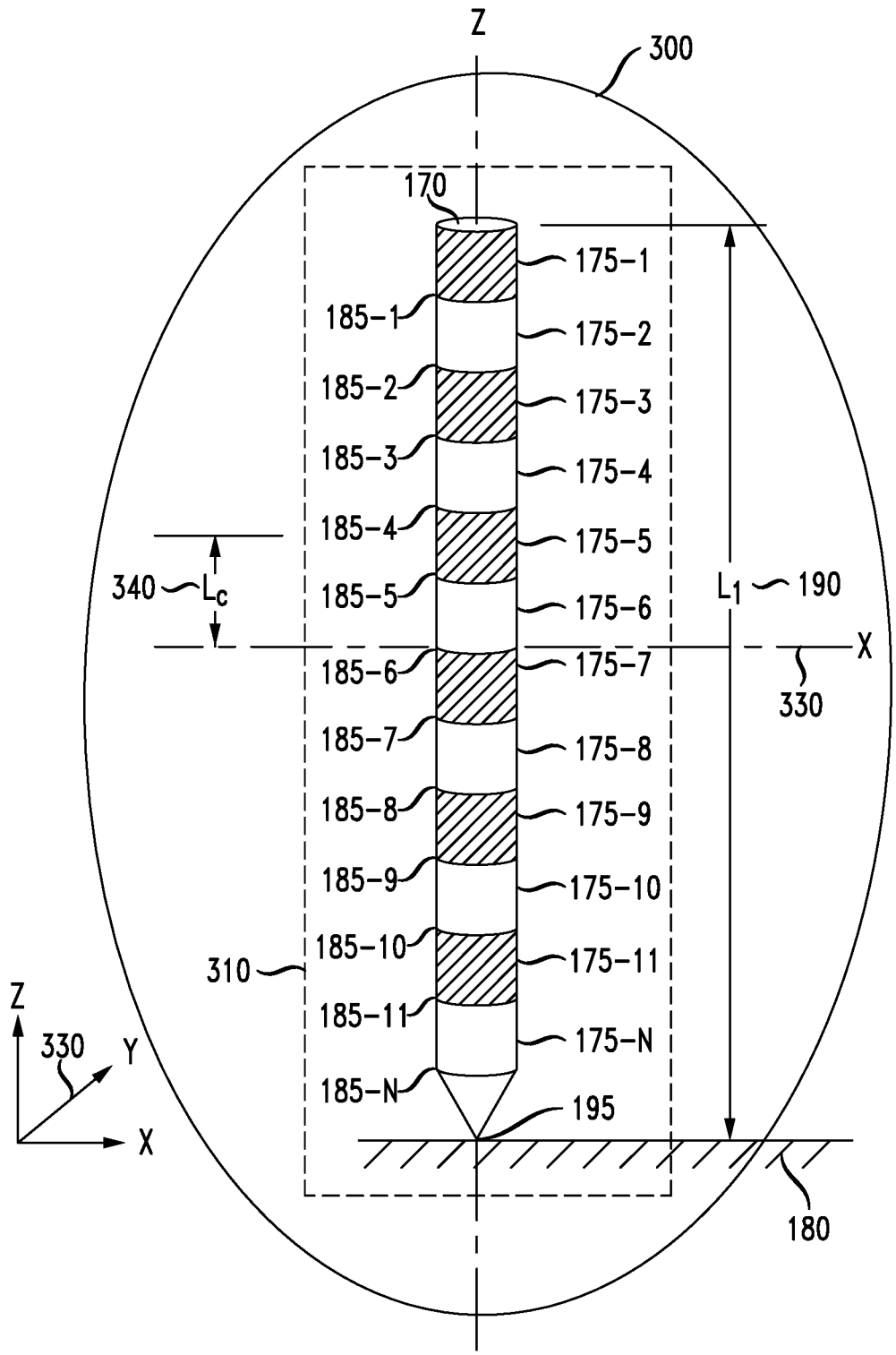
FIG. 3 shows the generation of an image of a target object in a field of view of the measurement system of FIG. 1 for measuring height difference in accordance with an embodiment.

In accordance with a further embodiment, as shown in FIG. 1, camera 150 is positioned at a first location (i.e., location 145) and levelled, target object 170 (as detailed above) is positioned at a second location (i.e., location 195) and levelled, and an image is taken by camera 150 of target object 170 as detailed above. In particular, as shown in FIG. 3, image 310, in field of view 300, as taken by camera 150 is processed to remove optical distortions, and all (or substantially all) of the contrasting boundaries/edges associated with the plurality of markings 175-1 through 175-N on target object 170 are located and identified on the image by applying certain image processing as detailed above. In the embodiment, field of view 300 also includes coordinate axes 320 where a vertical axes Z and a horizontal axes X are illustrated as a "crosshair" with a third axes (e.g., axes Y) being perpendicular to each of the vertical axes Z and the horizontal axes X. Next, the locations of the contrasting boundaries/edges on target object 170 with respect to centerline 330 associated with image 210 of target object 170 are estimated by applying certain mathematical optimization such as least square regression using the plurality of boundaries 185-1, 185-2, 185-3, 185-4, 185-5, 185-6, 185-7, 185-8, 185-9, 185-10, 185-11, and 185-N and the defined geometric properties of the target object 170 (i.e., $L_1$ 190 and W 125). Illustratively, centerline 330 of image 210 is established as a horizontal row of pixels with zero ("0") vertical angle, for example, being parallel to the surface of the Earth.

For example, location 340 (i.e., $L_C$) is the location between boundary 185-4 (i.e., the boundary between contrasting markings 175-4 and 175-5, respectively) and centerline 330 which will be one such location determination with similar location determinations begin made with respect to each of the plurality of boundaries 185-1 through 185-N and centerline 330. In this way, an estimation of the locations of the contrasting boundaries/edges on target object 175 is facilitated with a subpixel accuracy. Finally, an estimate of height difference (i.e., $H_C$ 135 as shown in FIG. 1) from camera 150 to target object 170 is made by developing and examining a mathematical relationship between the estimation of the locations of the contrasting boundaries/edges on target object 170 to the defined geometric properties of target object 170 (i.e., $L_1$ 190 and $W_1$ 125). That is, the height difference ($H_C$) 135 (i.e., the height difference between camera 150 and target object 170) is estimated by relating the estimated locations of the edges of target object 170 (as detailed above) on image 310 to the physical height of target object 170. For example, the height difference with a target object having a 2 meter length with 25 contrasting markings can be estimated with an average error of $\frac{1}{12}$ pixel (or approximately 0.7 mm) from the distance of 30 m.

Figure 4:
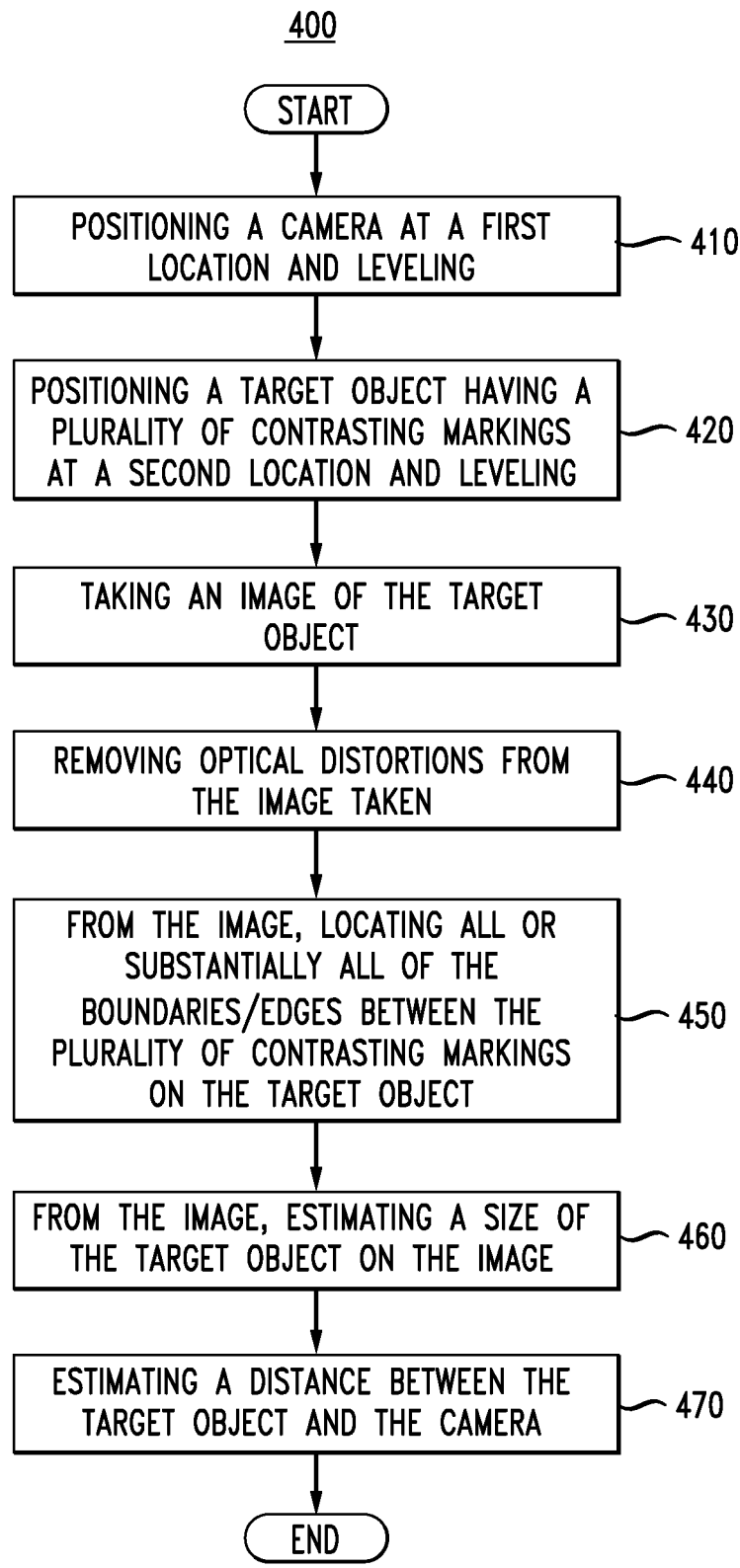
FIG. 4 shows a flowchart of illustrative operations for estimating a distance between a target object and a single camera in accordance with an embodiment.

FIG. 4 shows a flowchart of illustrative operations 400 for estimating a distance between a target object and a single camera in accordance with an embodiment. As shown, at step 410, a camera is positioned at a first location and levelled. At step 420, a target object having a plurality of contrasting markings, as detailed above, is positioned at a second location and levelled, and an image is taken, at step 430, of the target object by the camera. Optical distortions are removed, at step 440 from the image. From the image, all or substantially all of the boundaries/edges between the plurality of contrasting markings on the target object are located at step 450 to allow for, at step 460, an estimating of a size of the target object on the image. Using the estimated size of the image, the defined physical size of the target object and the known optical properties of the camera, the distance between the target object and the camera is estimated at step 470, as detailed herein above.

Figure 5:
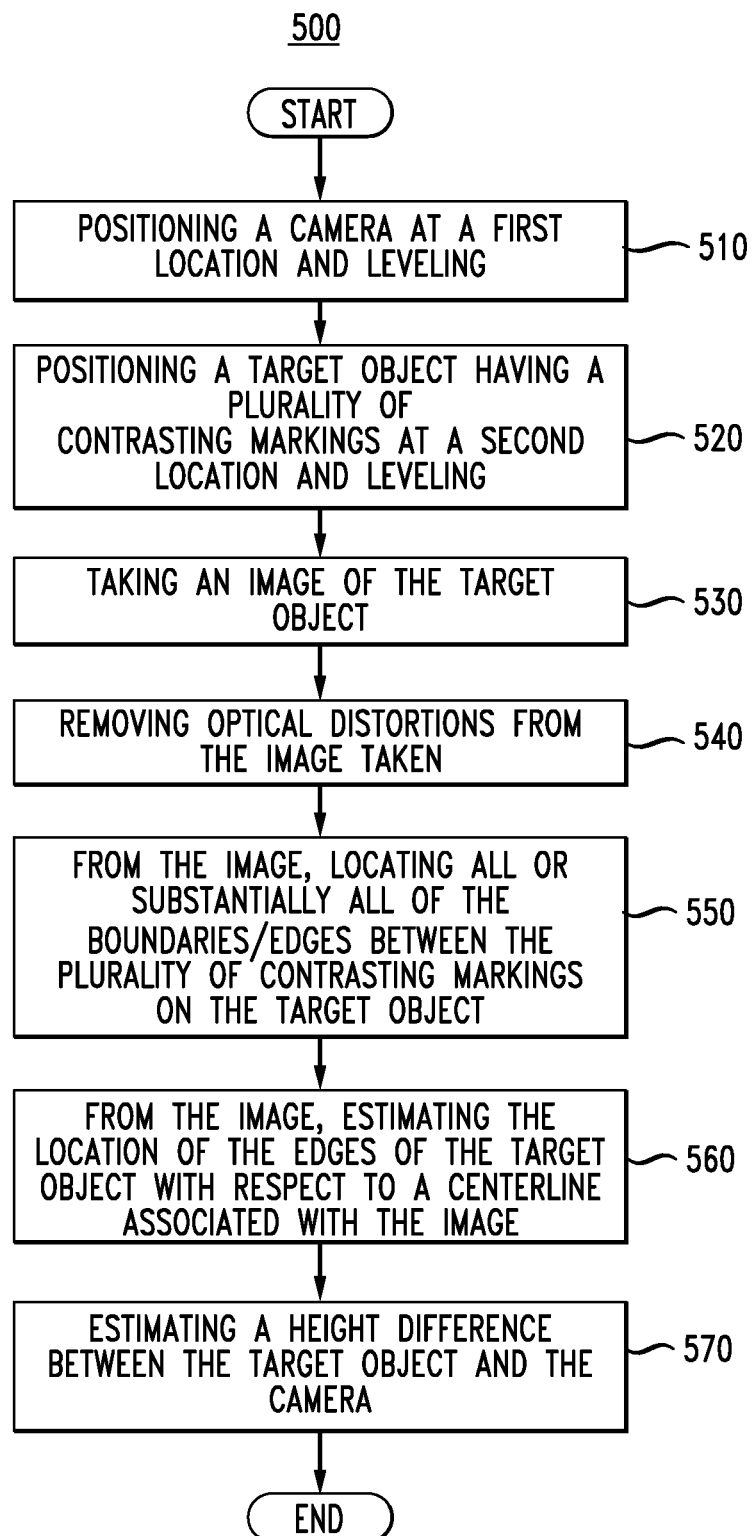
FIG. 5 shows a flowchart of illustrative operations for estimating a height difference between a target object and a single camera in accordance with an embodiment.

FIG. 5 shows a flowchart of illustrative operations 500 for estimating a height difference between a target object and a single camera in accordance with an embodiment. As shown, at step 510, a camera is positioned at a first location and levelled. At step 520, a target object having a plurality of contrasting markings, as detailed above, is positioned at a second location and levelled, and an image is taken, at step 530, of the target object by the camera. Optical distortions are removed, at step 540 from the image. From the image, all or substantially all of the boundaries/edges between the plurality of contrasting markings on the target object are located at step 550 to allow for, at step 560, estimation of the location of the edges of the target object with respect to the horizontal centerline associated with the image, as detailed above. The height difference is then estimated, at step 570, by relating the estimated locations of the edges of target object on the target image to the defined physical height of target object, as detailed herein above.

Figure 6:
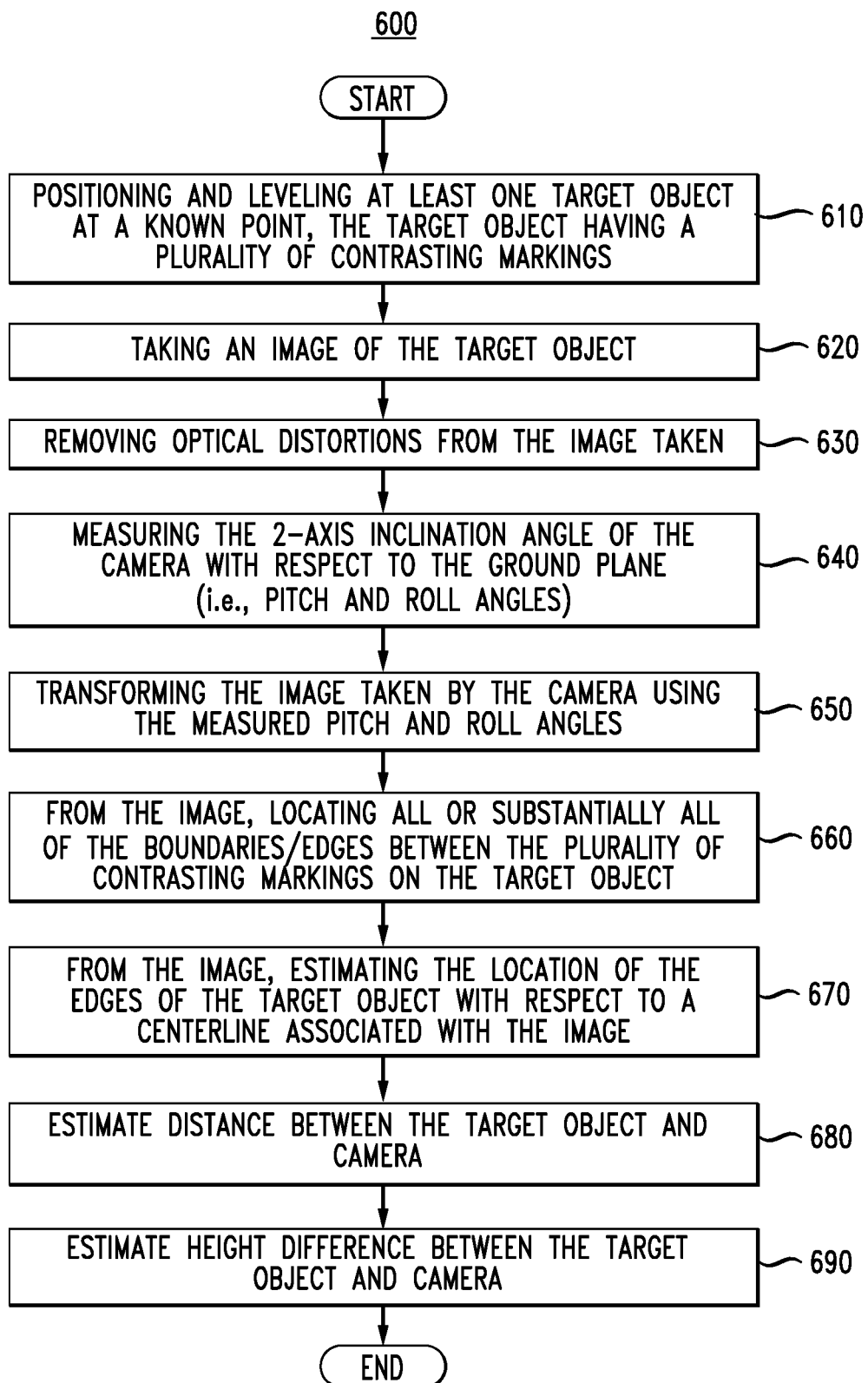
FIG. 6 shows a flowchart of illustrative operations for estimating distance and/or height difference between a target object and a single camera in an unlevelled environment in accordance with an embodiment.

FIG. 6 shows a flowchart of illustrative operations 600 for estimating distance and/or height difference between a target object and a single camera in an unlevelled environment in accordance with an embodiment. For example, in certain situations it may be that the camera or the target object cannot be levelled for some reason but the optical measuring of the distance and height difference can still be accomplished in accordance with further embodiments. In FIG. 6, the embodiment is directed to the situation where the camera cannot be levelled (e.g., mounted on a moving vehicle) and in all embodiments involving an unlevelled situation it will be understood that the camera is configured with an optional inclination sensor (e.g., camera 150 and inclination sensor 145 as shown in FIG. 1).

As shown, at step 610, at least one target object is positioned at a known location and levelled with the target object having a plurality of contrasting markings, as detailed above. At step 620, an image of the target object is taken and optical distortions are removed from the image at step 630. At step 640, the 2-axis inclination angle of the camera with respect to the ground plane (i.e., pitch and roll angles) are measured using the inclination sensor 145, as detailed above, the operations of which will be well understood by one skilled in the art. At step 650, the image taken by the camera is transformed using the measured pitch and roll angles as if the image was taken from the levelled camera in a well-known manner. From the image, at step 660, all or substantially all of the boundaries/edges between the plurality of contrasting markings on the target object are located, and the location of the edges of the target object with respect to a centerline associated with the image is made at step 670, as detailed above. At step 680, an estimate of the distance between the target objects and the camera is made and an estimate of the height difference between the target objects and the camera is made at step 690.

Figure 7:
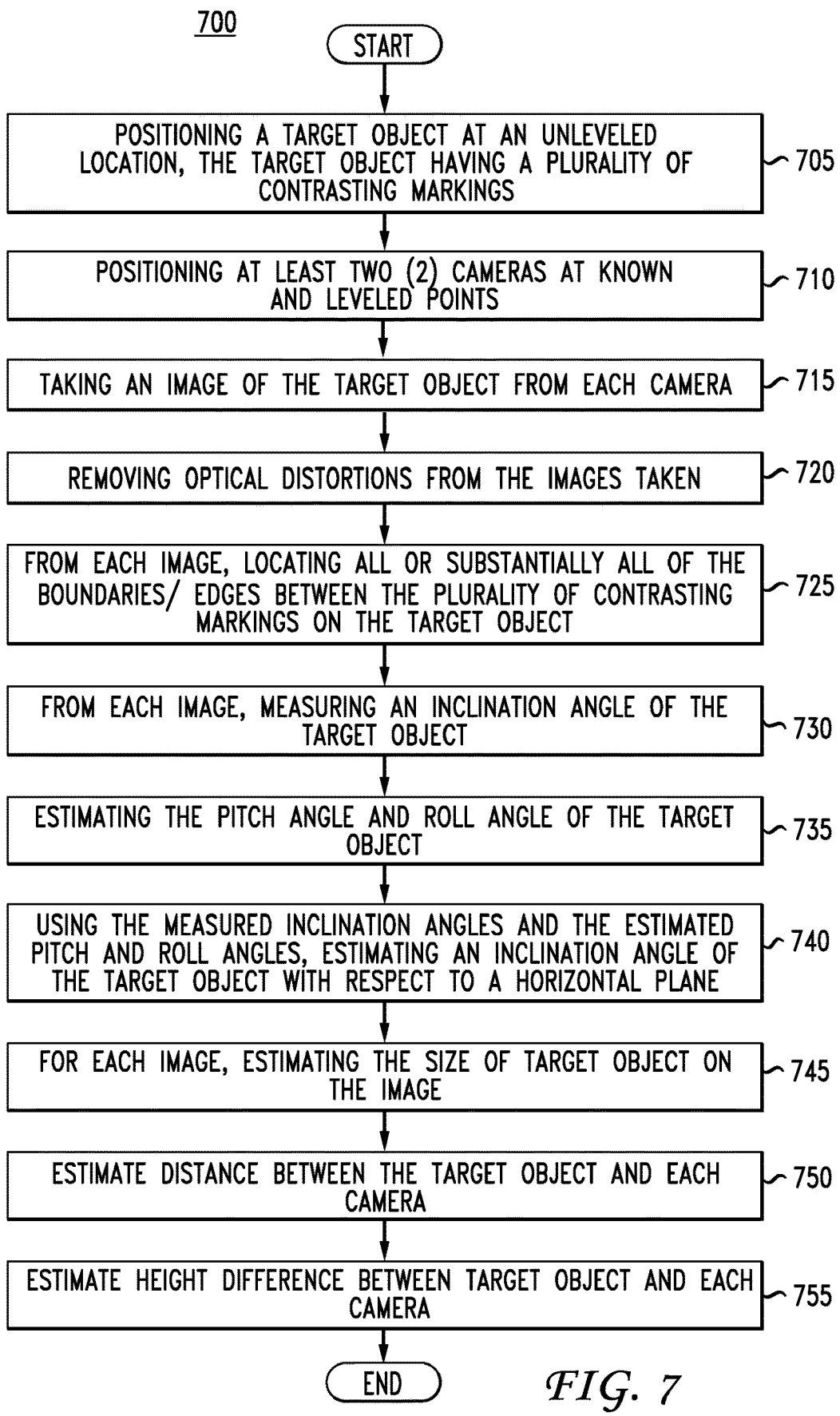
FIG. 7 shows a flowchart of illustrative operations for estimating distance and/or height difference where the target object is not levelled, and at least two (2) cameras are utilized in accordance with an embodiment.

FIG. 7 shows a flowchart of illustrative operations 700 for estimating distance and/or height difference where the target object is not levelled, and at least two (2) cameras are utilized in accordance with an embodiment. In particular, at step 705, a target object is positioned at an unlevelled first location, and at least two (2) cameras are positioned, at step 710, at a second location and third location, respectively, and levelled, and one (1) image of the target object is taken by each of the respective cameras, at step 715. In accordance with the embodiment, the positions of the cameras are selected such that they are in different directions from the target object (i.e., they are not directly opposite one another in the same path). The images are then processed, at step 720, to remove optical distortions, and all (or substantially all) of the contrasting boundaries/edges on the target objects are located, at step 725, and identified on the images by applying certain image processing such as SURF.

Next, at step 730, the inclinations of the images of the target object on each image are measured. For each camera, these inclinations are a function of pitch and roll of the target object in the orthogonal coordinate system relative to this camera. If the relative positions and orientations of the camera(s) in space are known, 2 equations define the spatial transformation between these camera coordinate systems, and hence define a relation between pitch and roll of the target object with respect to these systems. Next, this system of defined equations (i.e., 4 equations) is solved (which can be done if both cameras and target do not lie on the same line), and estimates of pitch and roll of the target object are obtained at step 735. The inclination of the target with respect to the horizontal plane is estimated, at step 740, from inclinations of the images of the target on images taken from these 2 cameras.

More particularly, if the target is inclined, the length in pixels of its image can change, which would affect the estimation of distance, and the estimation of height difference as a consequence. A small inclination is not a problem, because this leads to a very small change in visible length (e.g., if the angle in radians is x and is small, the change in visible length is proportional to $x^2$, which is very small). Hence, the accuracy of measurement of the target inclination is not important.

There are multiple equivalent mathematical formulations of inclination. A common notation for an orthogonal XYZ coordinate system used herein is the one of heading (i.e., rotation around Z axis), roll (i.e., rotation around Y axis) and pitch (i.e., rotation around X axis). One need be not concerned about heading, since rotation of the symmetrical target around the Z (i.e., vertical) axis does not change the way it looks from any camera. Hence, the 2 angles which can affect the measurements of distance and height difference are pitch and roll.

In the case of a single levelled camera, one can define the X'Y'Z' system connected with this camera; that is, define the horizontal centerline of the camera sensor as X', vertical centerline as Z', and normal to the sensor as Y'. Next, one can measure the inclination of the image of the target object, and this inclination will be a function of roll and pitch of the target object with respect to X'Y'Z' (mostly dependent on the roll; and inclination will depend on pitch only for close targets away from the vertical centerline). If one introduces a second camera, one can define a second system X"Y"Z", and take similar steps. However, if the locations and orientations of both cameras are known, the transformation between X'Y'Z' and X"Y"Z" systems can be defined by two well-known equations; as a result, one has a system of 4 equations with 4 unknowns, which can be solved if it is not singular (that is, if both cameras and target do not lie on the same line). Further, the best situation in terms of such computations is when Y' and Y" are orthogonal.

Next, at step 745, the size of the target objects on the images is estimated by applying certain mathematical optimization such as least square regression using the identified locations of the contrasting boundaries/edges (as detailed above) and the known geometric properties of the target objects (e.g., the length, diameter, and the pitch and roll angles). Finally, an estimate of the distance to the target object from each of the cameras is made, at step 750, and the height differences between the target object and the cameras is made, at step 755, using the estimated size of the target objects, the defined geometric properties of the target objects, and the optical properties of the cameras, as detailed above.

Figure 8:
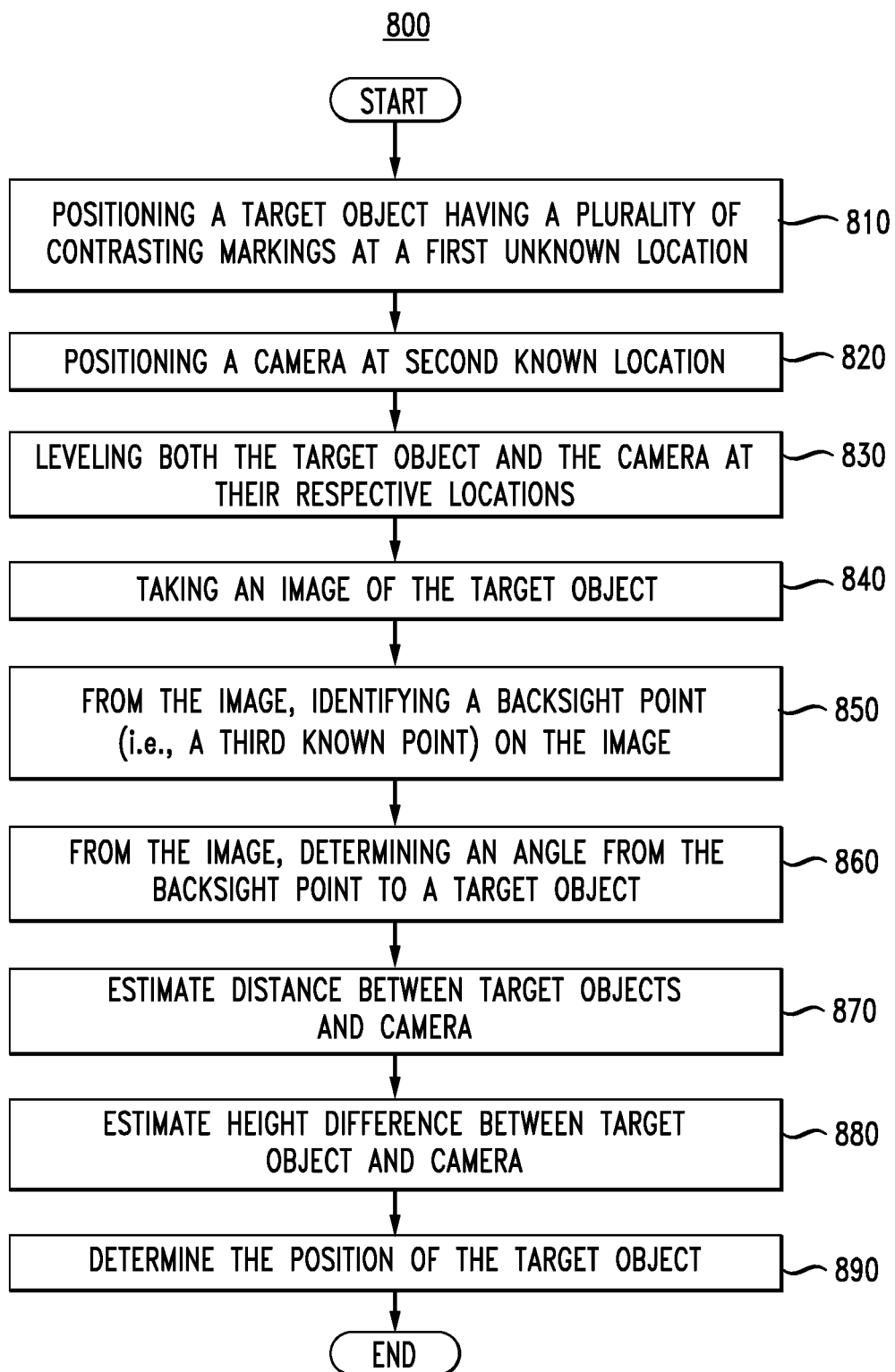
FIG. 8 shows a flowchart of illustrative operations for estimating a position of unknown point in accordance with an embodiment.

If the relative positions and/or orientations of the cameras are not known, they can be estimated from the estimation of distance, height difference and direction to the target object. First, roll and pitch are set to some initial value (for example, for each image the pitch angle can be set to zero and the roll angle set to the value of the inclination of the image of the target object), distances and height differences from each camera to the target object are estimated as detailed above, directions from each camera to the target object are measured directly from the images, and from these relative positions and orientations of the cameras are estimated. Next, roll and pitch of the target object are estimated by the procedure described above, and relative positions and orientations of the cameras are re-estimated. Thereafter, this step is repeated until the process converges FIG. 8 shows a flowchart of illustrative operations 800 for estimating a position of unknown point in accordance with an embodiment. In accordance with this embodiment, one of either the single camera or the target object is at an unknown location and its position is determined. In particular, in the embodiment shown in FIG. 8, at step 810, the target object having a plurality of markings is set at a first unknown location (or point), at step 820, the single camera is set at a second known location (or point), each of the target object and single camera are levelled at their respective locations at step 830, and an image is taken of the target object at step 840. Using the image taken, a third known point is identified (i.e., the backsight), at step 850, which is illustratively identified by the operator of the camera from the image and the coordinates provided as input to the image measurement system. Alternatively, the backsight may be automatically determined on the image by the image measurement system, for example, placing a predefined target on the backsight, or the location of the backsight can be determined from a previous image. Further, at step 860, from the image, the angle from the backsight to the target object is determined by counting horizontally the number of pixels between respective images of the target object, and multiplying by the horizontal angular resolution of a pixel. Next, at steps 870 and 880, respectively, the distance and height difference from the single camera to the target object are determined as set forth herein above. Then, at step 890, the position of the target object is determined using the known positions of the single camera and backsight, the computed angle from the backsight to the target object, and the computed distance and height difference from the camera to the target object. In an alternative scenario to the one just described (i.e., the target object position is known, and the camera position is unknown), the same steps are followed, as detailed herein above, with same inputs and solving the same equations, also as detailed herein above.

In accordance with a further embodiment of the operations shown in FIG. 8, the target object is positioned at a known location and levelled and the camera (equipped with the optional inclination sensor 145, as detailed herein above) is located at an unknown location (which is not levelled) and the distance and/or height difference may be determined as set forth above.

In accordance with a further embodiment of the operations shown in FIG. 8, at least two cameras are positioned at respective known locations (each of which is levelled) and the target object is located at an unknown location (which is not levelled and may be subject to an incline). An image is taken from each camera of the target object and, using the respective images, the distance and/or height differences from each camera to the target object may be determined as set forth above, and the position of the target object is determined in accordance with operations set forth herein above.

As noted above, if the respective cameras are at unknown locations, the position of the target object is still determinable with respect to a new coordinate system related to such cameras (e.g., the position of a first camera can be set at (0, 0, 0) with associated X, Y, Z axes which serve as the set of axes of such coordinate system). Further, the relative position of the second camera is determined as detailed above which allows for the distance and/or height difference to be determined, without further modifications, as set forth above.

The various embodiments detailed above take into account various scenarios for which the camera and/or target object is levelled (or there is an expectation that they will be levelled or caused to be levelled at their respective position). Of course, as will be appreciated, such embodiments may also encompass scenarios in which the camera and/or the target object are inclined (and the inclination is fixed and known, e.g. two angles of inclination with respect to the camera are measured) and for which the above-described operations for the measurement of distance, height difference and/or position are equally applied.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:
1. A method comprising:
   acquiring an image of a target object from a camera, the target object having a defined physical size and a plurality of contrasting markings disposed on an outer surface thereof;
   locating, from the image, a plurality of boundaries associated with the plurality of contrasting markings with respect to a horizontal centerline of the target object;
   estimating, from the image, a size of the target object in the image based on the plurality of boundaries;

locating edges of the plurality of boundaries between substantially all of the plurality of contrasting markings disposed on the outer surface of the target object; and determining a distance between the target object and the camera based on the edges between substantially all of the plurality of contrasting markings and the estimated size of the target object in the image, the defined physical size of the target object, and at least one optical property associated with the camera.

2. The method of claim 1, further comprising:

positioning the camera at a first location and leveling the camera at the first location; and positioning the target object at a second location and levelling the target object at the second location.

3. The method of claim 1, wherein the plurality of contrasting markings are equally spaced on the outer surface of the target object.

4. The method of claim 3, wherein the plurality of contrasting markings are horizontal markings having alternating colors.

5. The method of claim 4, wherein a total number of the plurality of contrasting markings is between 15 and 50, and the defined physical size of the target object is at least 2 meters in length.

6. The method of claim 1, wherein the locating, from the image, the plurality of boundaries associated with the plurality of contrasting markings comprises locating substantially all of the plurality of boundaries associated with the plurality of contrasting markings.

7. An apparatus comprising:

a processor; and a non-transitory memory to store computer program instructions, the computer program instructions when executed by the processor cause the processor to perform operations comprising:

acquiring an image of a target object from a camera, the target object having a defined physical size and a plurality of contrasting markings disposed on an outer surface thereof;

locating, from the image, a plurality of boundaries associated with the plurality of contrasting markings with respect to a horizontal centerline of the target object;

estimating, from the image, a size of the target object in the image based on the plurality of boundaries;

locating edges of the plurality of boundaries between substantially all of the plurality of contrasting markings disposed on the outer surface of the target object; and determining a distance between the target object and the camera based on the edges between substantially all of the plurality of contrasting markings and the estimated size of the target object in the image, the defined physical size of the target object, and at least one optical property associated with the camera.

8. The apparatus of claim 7, wherein the camera is positioned and leveled at a first location and the target object is positioned and leveled at a second location.

9. The apparatus of claim 7, wherein the plurality of contrasting markings are equally spaced on the outer surface of the target object.

10. The apparatus of claim 9, wherein the plurality of contrasting markings are horizontal markings having alternating colors.

11. The apparatus of claim 10, wherein a total number of the plurality of contrasting markings is between 15 and 50, and the defined physical size of the target object is at least 2 meters in length.

12. The apparatus of claim 7, wherein the locating, from the image, the plurality of boundaries associated with the plurality of contrasting markings comprises locating substantially all of the plurality of boundaries associated with the plurality of contrasting markings.

13. A non-transitory computer readable medium storing computer program instructions which, when executed on a processor, cause the processor to perform operations comprising:

acquiring an image of a target object from a camera, the target object having a defined physical size and a plurality of contrasting markings disposed on an outer surface thereof;

locating, from the image, a plurality of boundaries associated with the plurality of contrasting markings with respect to a horizontal centerline of the target object;

estimating, from the image, a size of the target object in the image based on the plurality of boundaries;

locating edges of the plurality of boundaries between substantially all of the plurality of contrasting markings disposed on the outer surface of the target object; and determining a distance between the target object and the camera based on the edges between substantially all of the plurality of contrasting markings and the estimated size of the target object in the image, the defined physical size of the target object, and at least one optical property associated with the camera.

14. The non-transitory computer readable medium of claim 13, wherein the camera is positioned and leveled at a first location and the target object is positioned and leveled at a second location.

15. The non-transitory computer readable medium of claim 13, wherein the plurality of contrasting markings are equally spaced on the outer surface of the target object.

16. The non-transitory computer readable medium of claim 15, wherein the plurality of contrasting markings are horizontal markings having alternating colors.

17. The non-transitory computer readable medium of claim 16, wherein a total number of the plurality of contrasting markings is between 15 and 50, and the defined physical size of the target object is at least 2 meters in length.

18. The non-transitory computer readable medium of claim 13, wherein the locating, from the image, the plurality of boundaries associated with the plurality of contrasting markings comprises locating substantially all of the plurality of boundaries associated with the plurality of contrasting markings.

* * * * *